United States Patent [19]

Sawaguchi et al.

[11] Patent Number: 5,539,588
[45] Date of Patent: Jul. 23, 1996

[54] MAGNETIC RECORDING/REPRODUCING WITH ADDED INTERSYMBOL INTERFERENCE TO OBTAIN A PARTIAL-RESPONSE CODE

[75] Inventors: Hideki Sawaguchi, Kodaira; Mikio Suzuki, Kokubunji; Hiroko Sukeda, Kodaira, all of Japan

[73] Assignee: Hitachi, Ltd., Tokyo, Japan

[21] Appl. No.: 189,641

[22] Filed: Feb. 1, 1994

[30] Foreign Application Priority Data

Feb. 4, 1993 [JP] Japan ................... 5-017283

[51] Int. Cl.⁶ ............................. G11B 5/09; G11B 5/035
[52] U.S. Cl. ...................... 360/46; 360/45; 360/65
[58] Field of Search ........................... 360/40, 45, 46, 360/65; 375/14, 18, 20, 101, 263, 290, 291; 341/59, 57

[56] References Cited

U.S. PATENT DOCUMENTS

| | | | |
|---|---|---|---|
| 4,571,734 | 2/1986 | Dolivo et al. | 375/18 |
| 4,984,099 | 1/1991 | Kanota et al. | 360/46 |
| 5,036,524 | 7/1991 | Bergmans et al. | 375/12 |
| 5,270,876 | 12/1993 | Inoue et al. | 360/40 |
| 5,276,709 | 1/1994 | Kazawa et al. | 375/25 |

OTHER PUBLICATIONS

IEEE Transactions on Communications, vol. COM-23, No. 9, Sep. 1975, "Partial-Response Signaling", Kabal et al, pp. 921–934.

IEEE Transactions on Magnetis, vol. MAG-16, No. 5, Sep. 1980, "Studies of the Perpendicular Magnetization Mode in Co–Cr Sputtered Films", Iwasaki et al, pp. 1111–1113.

Primary Examiner—W. Chris Kim
Attorney, Agent, or Firm—Fay, Sharpe, Beall, Fagan, Minnich & McKee

[57] ABSTRACT

A magnetic recording/reproducing uses a wide frequency band of a DC component to the next lowest spectral null frequency point and higher by using an existing recording/reproducing head and medium. Intersymbol interference is added to a magnetic recording channel so that an impulse response comes to a partial-response channel shown by polynomial $1-D^n$ ($D^n$ is an n-bit signal delay); in which T is a Nyquist interval (reproduction-bit time interval), the values of (n>2) and T are selected by assuming equal frequency interval between the spectral null frequency points $1/nT$, and thereby a symbol string having a Nyquist frequency equal to or higher than the second spectral null frequency point from the lowest frequency side excluding the vicinity of the DC component of the recording/reproducing characteristic is recorded or reproduced.

28 Claims, 9 Drawing Sheets

MAGNETIC RECORDING/REPRODUCING WITH ADDED INTERSYMBOL INTERFERENCE TO OBTAIN A PARTIAL-RESPONSE CODE

BACKGROUND OF THE PRESENT INVENTION

The present invention relates to magnetically recording or reproducing a wide bandwidth signal through a magnetic recording/reproducing head and a recording medium.

With respect to digital data recorded on a magnetic recording medium at a high density, a signal obtained by reproducing the digital data has various types of frequency characteristic degradation depending on the characteristic of a recording/reproducing channel. The recording/reproducing channel includes a recording/reproducing head and recording medium. Recording frequency or recording density on the medium is restricted due to a high cut-off characteristic. For the longitudinal magnetic recording generally used at present, a spacing loss (in which a reproduced output decreases as a recording wavelength gets longer with respect to the distance between the recording medium and the reproducing head) and a gap loss (in which the reproduced output decreases as a gap length or longitudinal length of the reproducing head gap for attracting a recording magnetic field from the recording medium approaches the recording wavelength) are two types of frequency degradation. Particularly, the gap loss is a large factor for restricting the increase of recording density (shortening of a recording wavelength). With the gap length g and recording wavelength λ, the gap loss Lg in dB is given by the following theoretical expression.

$$Lg = -20 \log_{10} |\sin(\pi g/\lambda)| \quad [dB]$$

That is, as the gap length g becomes relatively longer than the recording wavelength λ, the reproduced output decreases. For a recording frequency in which the gap length g is an integer multiple of the recording wavelength λ, in particular, the loss becomes infinite and no signal can be output. Therefore, the recording frequency is limited between zero frequency and a frequency at which the recording wavelength λ equals the gap length "g". To record data at a shorter wavelength than the range, requires a finer head gap length g.

For an existing recording/reproducing channel, high frequency characteristic degradation due to the spacing loss is remarkable. The gap loss Lg shown by the above-theoretical expression is not found in the region of the short wavelength λ (high recording frequency). However, as the spacing is shortened and the recording density increases, the gap loss becomes remarkable in a higher-density recording/reproducing channel and the recording-wavelength λ in the above expression becomes a dominant factor in the recording/reproducing channel frequency characteristic degradation. Thus, a comb-shaped output having a plurality of spectral null frequency points appears as shown in FIG. 2(a). Moreover, the loss is even more remarkable in perpendicular magnetic recording.

To uniformly or accurately record or reproduce a signal having a frequency distribution over a wide bandwidth as shown in FIG. 2(b) in or from a recording/reproducing channel having the above frequency characteristic FIG. 2(a), is difficult in the prior art because data is missed when the output is at a null point in the spectrum of a recorded/reproduced signal. Therefore, only the frequency band of the first output peak portion ranging from a DC component to the next lowest spectral null frequency point is used conventionally, and it is difficult or impossible to use a higher frequency band of the second and third output peak portions. In other words, the magnetic recording/reproducing channel of the prior art is limited in the frequency band used, and the recording density on a recording medium is also limited due to the limitation of the recorded/reproduced signal frequency, so that a characteristic such as shown in FIGS. 2(b) and 2(c) cannot be obtained practically.

Moreover, for an existing magnetic recording channel, a recorded signal is accurately reproduced by improving the frequency characteristic degradation in the vicinity of the spectral null frequency point of the band from a DC component to the next lowest spectral null frequency point or lower with an equalization circuit, and thereby improving the frequency characteristic of the recording/reproducing channel in the frequency band used into a flat characteristic. However, when the recording density increases: wider bandwidth is requested, and bands close to the spectral null frequency point are used; and the load of the equalization circuit greatly increases to compensate for a high-frequency signal greatly weakened near the null point and therefore, a problem occurs that the signal to noise ratio of signal components in the vicinity of the spectral null frequency point is greatly degraded due to increase of noise caused by an increase of the amount of compensation. Although filtering and equalization help near the null point, they cannot compensate for a null point, i.e. the prior art cannot accurately operate at or very near the null point.

The partial response signaling, e.g. class 4, can be capable of transmitting data at a Nyquist rate without changing the characteristic of the whole transmission channel to the above ideal band limit characteristic. This system is described in Kabal, Peter et al, "Partial Response Signaling" of IEEE TRANSACTIONS ON COMMUNICATION, Vol. COM-23, No. 9, September, 1975, pp. 921–934.

SUMMARY

It is an object of the present invention to analyze the prior art, identify problems and their causes and overcome such problems, which has been done to some extent above.

The partial response system makes it possible to transmit data at a Nyquist rate by intentionally adding intersymbol interference (a phenomenon caused by plural analog signals which has been considered to be undesirable for data transmission) according to a certain rule (the intersymbol interference being canceled by equalization). To execute signal transmission at the Nyquist rate without causing the intersymbol interference to other bit regions, the frequency characteristic of a transmission channel should be flat in bands up to a Nyquist frequency. However, the partial response system makes it possible to transmit signals without making the frequency characteristic of the transmission channel flat by permitting the intersymbol interference of signals at a known level to a plurality of succeeding bits. In general, a method for intersymbol interference addition realizes a frequency characteristic as close to the original frequency characteristic of a transmission channel as possible. It is possible to simplify Nyquist-rate transmission by moderating an originally-sharp cut-off characteristic so that a required characteristic in the vicinity of a Nyquist frequency is improved as advantageously as possible.

Because low frequencies are cut off in a magnetic recording/reproducing channel, the partial response system is conventionally used to describe the impulse response characteristic by using polynomials 1–D, 1+D or 1–$D^2$. $D^n$ is a delay interval of n-bit transmission, n being an integer symbol time. For example, the expression 1–$D^2$ means that the system response for impulse (. . . 0001000 . . . ) has 3 bit's length response (. . . 00010-10 . . . ). In particular, the partial-response Class-4 system (modified duo-binary system) described by the polynomial 1–$D^2$ is suitable for the band characteristics from a DC component to a frequency very close to the next lowest spectral null frequency point as shown in FIG. 2(a) and effective as a method effectively using the frequency band of a recording/reproducing channel because the system has the output of 0 at a Nyquist frequency in addition to a DC component and permits a moderate damping characteristic in frequency regions around the Nyquist frequency in view of the frequency characteristic as shown in FIG. 2(d). The details are disclosed in U.S. Pat. No. 4,571,734 issued Feb. 18, 1986.

As described above, for the existing recording/reproducing system using equalization compensation, the highest frequency and band of the recorded/reproduced signal of the system is limited to a range in which the characteristic according to the equalization compensation can be flattened in the band between a DC component and the next-lowest spectral null frequency point or lower in view of the frequency characteristic of a channel, and thereby the recording density is also restricted. Moreover, for the conventional partial response system, the frequency band of the output peak portion between a DC component and the next-lowest spectral null frequency point can be used. However, using a high-frequency region exceeding the spectral null frequency point or a high recording density corresponding to the high frequency region has not been developed in the prior art.

It is an object of the present invention to provide magnetic recording/reproducing using wide frequency band signals exceeding the range from a DC component to the next-lowest spectral null frequency point for higher-density by using a conventional head and channel characteristic.

The present invention records or reproduces a symbol string by adding an intersymbol interference to a magnetic recording/channel so that an impulse response for a partial-response channel shown by polynomial 1–$D^n$ (D(n) is an n-bit signal delay and n is an integer, n>2) as shown in FIG. 1(a). T is a Nyquist interval (reproduction-bit time interval), the values of n and T are selected and set by assuming the equal frequency interval between the spectral null frequency points as 1/nT and (n is a positive integer greater than 2) and thereby a symbol string having a Nyquist frequency equal to or higher than the second spectral null frequency point from the lowest frequency excluding the vicinity of a DC component of the recording/reproducing characteristic is recorded or reproduced.

FIG. 5 shows the partial-response transmission channel for adding the above intersymbol interference to obtain the impulse response of polynomial (1–Dn), where n>2, for Nyquist-waveform-equalizing an isolated impulse waveform with a recording medium and recording/reproducing head 503, reproducing head 504, low-pass filter 506, and Nyquist filter 507, that is, filters having the characteristic of polynomial (1–D) and delay sum circuit 508 for delay-summing the equalized waveform so that it has the characteristic of polynomial (1–$D^n$)/(1–D).

As shown in FIGS. 1 and 8, the symbol converter 101 performs a converting operation corresponding to addition of the rear-stage intersymbol interference to the symbol string and the symbol converter 101 executes the exclusive-or-operation, XOR, between each bit of a symbol string and the n bit delayed symbol string bit (after delaying the symbol string n bits by, for example, the shift register 800 in FIG. 8).

Moreover, signal strings provided with an intersymbol interference are sequentially supplied to a plurality of discriminators arranged in parallel and the output signal of each discriminator is successively connected. In this case, by using a maximum likelihood estimator as a discriminator, a signal can be discriminated from signal patterns before and after a discrimination symbol. Therefore, even if noises are superimposed on an input signal, it is possible to obtain a high discrimination reliability estimated from a received value.

Moreover, because a perpendicular magnetic recording/reproducing apparatus has a compatibility suitable for high-density recording/reproducing, it is very effective to apply the present invention to a magnetic recording/reproducing apparatus using a magnetic recording/reproducing head and magnetic recording medium for perpendicular magnetic recording.

For the present invention, the transmission characteristic of a magnetic recording channel is designed to realize a partial-response channel in which the impulse response characteristic is described by the polynomial 1–$D^n$ (interleaved dicode; integer n>2) by extending the partial-response Class-4 system and a certain rule is applied to an intersymbol interference. A signal in this transmission channel, as shown in FIG. 2(e), permits a spectral null frequency point with the output of zero for frequency bands lower than a Nyquist frequency (½T; reproduced-signal bit time interval T) in addition to the DC component and frequency bands higher than the Nyquist frequency in view of the frequency characteristic. For the integer n, a spectral null frequency point is generally applied at an equal frequency interval of 1/nT from a DC component. Particularly, when setting the integer n to a positive integer greater than 2, a comb-shaped frequency characteristic is obtained in which the Nyquist frequency ½T is equalized with one of the spectral null frequency points. By using the characteristic of the partial-response channel, a wide-band transmission channel using the second spectral null frequency point onward from the lowest frequency side excluding the vicinity of a DC component as a Nyquist frequency is designed for a magnetic recording channel with a comb-shaped frequency characteristic. The phrase "excluding the vicinity of a DC component" is expressing that at the zero frequency point which is also the DC current point, there is no transmission and in the present invention we are not counting that DC current point as one of the n frequency null points. If we did count the DC current point in such a definition, then we would have to set n3 instead of n2.

That is, to equalize the spectral null frequency point of the magnetic recording channel with the spectral null frequency point of the partial-response channel frequency characteristic in FIG. 2(e), the frequency characteristic of a magnetic recording channel is compensated to the characteristic of the partial-response channel in FIG. 2(e) by setting in the middle of the channel an equalization circuit, filter, or circuit for performing addition/subtraction operation on a signal and the delay signal of the signal.

Thereby, a reproduced signal b(k) sent from a reproducing channel is provided with a predetermined interference by the impulse response characteristic polynomial 1–$D^n$ and then discriminated.

Therefore, the present invention compensates for the spectral null frequency point of a recording/reproducing channel. Thus, it is unnecessary to flatten the frequency characteristic of a frequency band used by the head. Thereby, it is possible to prevent signal to noise ratio from degrading due to extreme noise enhancement for frequency compensation and realize a recording/reproducing channel using wider frequency band including a plurality of spectral null frequency points of the recording/reproducing channel. Therefore, a recording/reproducing channel with a band wider than the existing one is realized for a head and the frequency characteristics of a recording medium and higher-speed higher-density recording/reproducing can be made. Moreover, it is possible to minimize the amount of frequency compensation, simplify the signal processing channel of a reproducing channel, and perform accurate recording/reproducing by fitting the partial-response transmission characteristic to a perpendicular magnetic recording/reproducing channel originally having a comb-shaped frequency characteristic.

Each of n series made by extracting the output of the interleaved dicode channel $1-D^n$ every n bits is an independent I-D output. That is, series of consecutive n bits are independent signals causing no intersymbol interference with each other. Therefore, it is possible to detect each of the signals with an independent discriminator and discriminate bits. Therefore, it is permitted to perform bit discrimination at a processing rate 1/n times the rate for sequential processing of original signal series by setting n discriminators in parallel and supplying to each discriminator independent signal series obtained by sampling channel-output reproduced signal series every "n" bits one by one, and thus it is possible to decrease the processing rate of each discriminator to 1/n. Therefore, the above is suitable for high-speed reproducing.

BRIEF DESCRIPTION OF THE DRAWINGS

Further objects, features and advantages of the present invention will become more clear from the following detailed description of a preferred embodiment, shown in the accompanying drawing, wherein.

DETAILED DESCRIPTION OF A PREFERRED EMBODIMENT

Figure 1A:
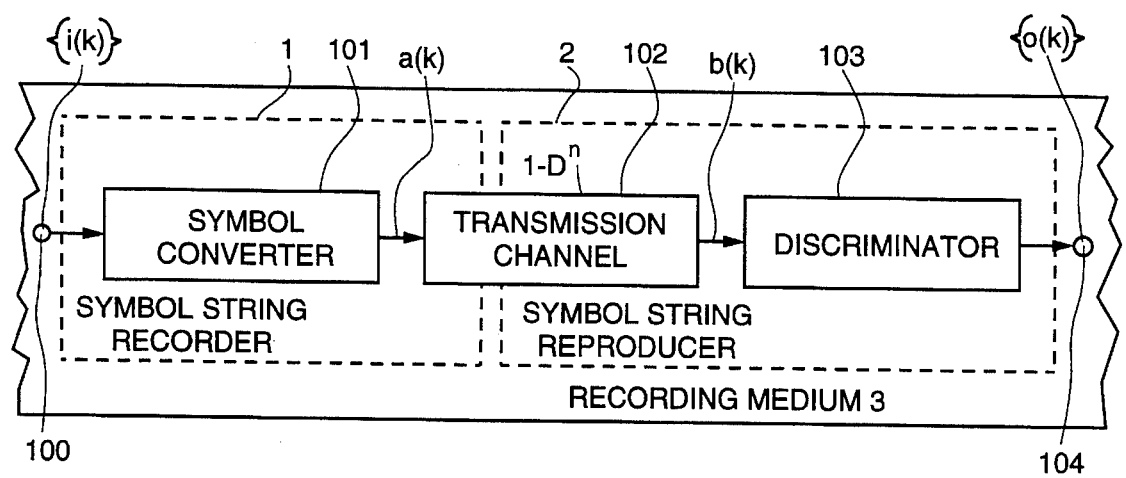
FIGS. 1(a) and 1(b) are a basic block diagram and signal characteristics (output vs. normalized frequency $f/\lambda$ of the transmission channel used in the present invention.
Figure 1B:
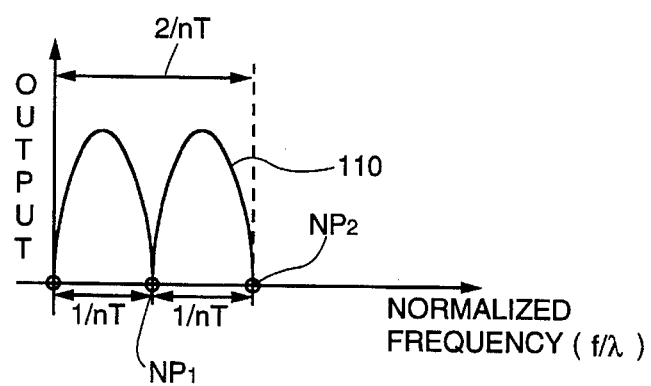

FIG. 1(a) shows a basic block diagram of the recording/reproducing channel and FIG. 1(b) shows a recording/reproducing characteristic of a partial-response in the recording/reproducing channel of FIG. 1(a).

As shown in FIG. 1(a), a recording medium 3 is in conformity with a transmission channel 102, which transmission channel 102 connects the symbol string recorder 1 including the recording head and the symbol string reproducer 2 including the reproducing head.

In this case, the frequency characteristic of the transmission channel 102 of FIG. 1(a) as shown in FIG. 1(b) is such that the impulse response is $1-D^n$. Where $D^n$ represents an impulse output after a delay of n bits, where n is a positive integer greater than 2. When n equals 4 and the input symbol series $\{a(k)\}$ of the transmission channel 102 is expressed as "... 0, 0, 1, 0, 0, 0, 0, 0, ..., , . ", the output symbol series $\{b(k)\}$ is expressed as a response of "... 0, 0, 1, 0, 0, 0, –1, 0 ... ". Here, $\{a(k)\}$ represents a digital string and a(k) represents an analog string. In this case, the frequency characteristic H(f), integer n, is shown as the expression (1), a band limit function (T is the Nyquist interval, i.e. reproducing bit time interval).

$$H(f)=2T*\text{rect}(Tf)* \sin(n\pi Tf) \quad (1)$$

Where, $$\text{rect}(Tf)=1 \ldots \text{For } |f|\leq \tfrac{1}{2}T$$

$$\text{rect}(Tf)=0 \ldots \text{For } |f|\geq \tfrac{1}{2}T$$

Therefore, when "n" equals 4, the transmission channel characteristic has a comb-shaped reproduced output recording/reproducing characteristic 110 and one spectral null frequency point $NP_1$, until the Nyquist frequency is $\tfrac{1}{2}T$ at spectral null frequency point $NP_2$, as shown in FIG. 1(b).

The impulse response h(t) of the transmission channel 102 is obtained from the inverse Fourier transform of the above expression H(f) as follows:

$$h(t)=\text{sinc}(t/T)-\text{sinc}((t-nT)/T) \quad (2)$$

Figure 3:
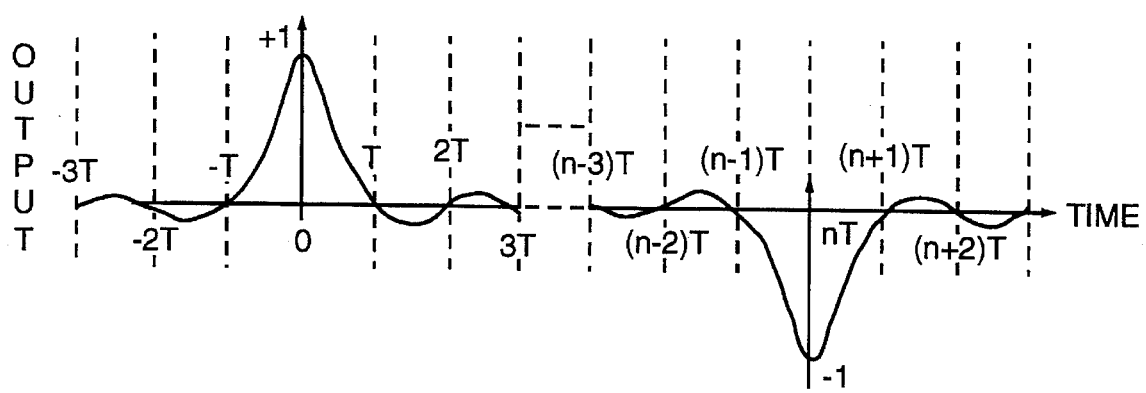
FIG. 3 is a diagram (output vs. time) for explaining the impulse response characteristic of the transmission channel of FIG. 1.

In this case, sinc(t) equals $\sin(\pi t)/(\pi t)$ the impulse response characteristic of the transmission channel of FIG. 1(a) is as illustrated in FIG. 3 (output amplitude vs. time). That is, the values obtained by sampling the output waveform, when using an impulse as an input of the transmission channel 102, at the bit position of every Nyquist interval T are expressed as "(h0, h1, ..., hn)=(+1, 0, 0, ... –1). In this case, the following relationship is between the input signal series $\{a(k)\}$ and the output signal series $\{b(k)\}$ of the transmission channel 102 shown in FIG. 1(a).

$$\{b(k)\}=H0,\{a(k)+h1*a(k-1)+h2*a(k-2)+\ldots=hn*a(k-n)=a(k)-a(k-n)\} \quad (3)$$

In FIG. 1(a) a symbol converter 101 or precoder (shown in FIG. 8) converts the input symbol series $\{i(k)\}$ from an input terminal 100 into a symbol string of $\{a(k)\}$. The conversion law is as shown below.

$$i(k)=[a(k)-a(k-n)]\mod 2 \quad (4)$$

In the expression (4), "mod2" shows an operation using 2 as a modulus, that is, an operation for using a remainder obtained by dividing a value by 2, which is expressed as "[0]mod2=0, [1]mod2=1, [–1]mod2=1, [2]mod2-0, [–2]

mod2=0". In this case, the discrimination value {o(k)} is expressed as {i(k)}={o(k)} by performing the operation of $$\{o(k)\}=\{[b(k)]mod2\} \quad (5)$$

Figure 2A:
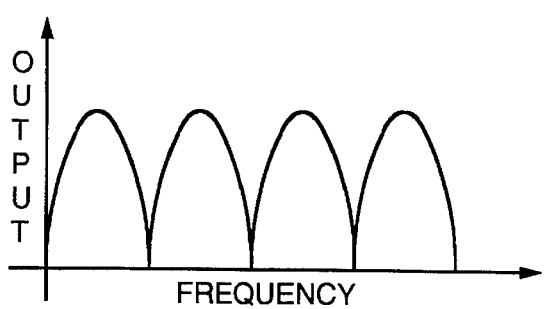
FIGS. 2(a) to 2(e) are diagrams (output vs. normalized frequency, $f/\lambda$) for explaining frequency characteristics.
Figure 2B:
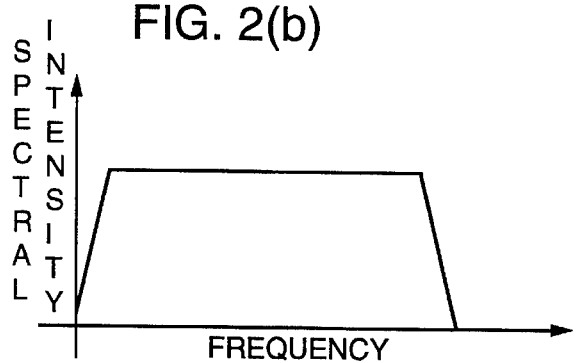
Figure 2C:
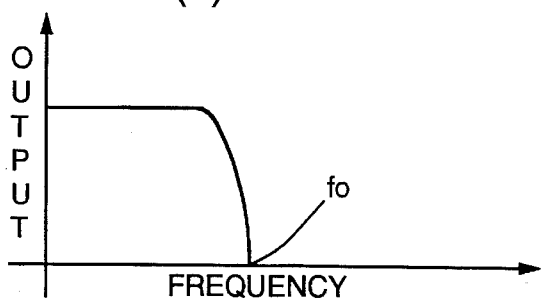
Figure 2D:
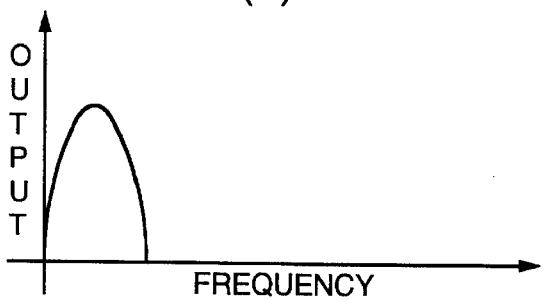
Figure 2E:
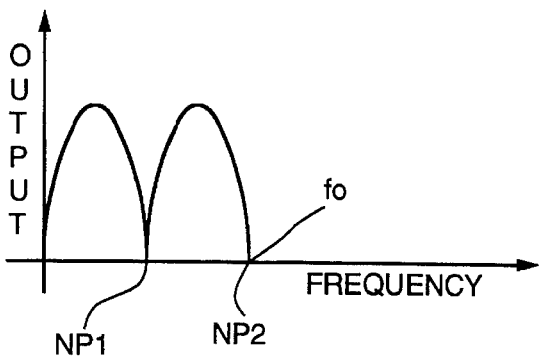
Figure 4:
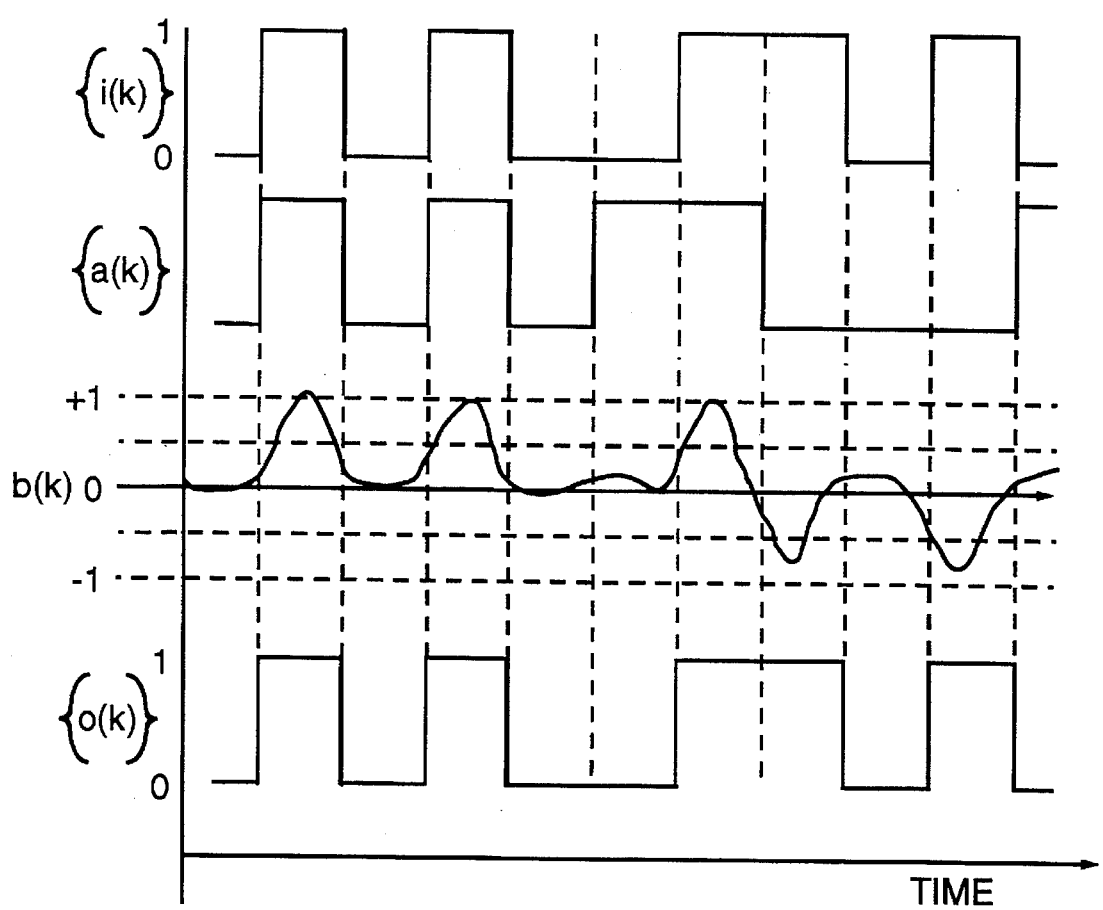
FIG. 4 is a synchronized timing diagram (amplitude vs. time) for explaining symbol examples of various signals in different locations of FIG. 1.

That is, the input symbol series i(k) inputted to the input terminal 100 is accurately reproduced and outputted from an output terminal 104. For example, when considering a case for using up to the null point $NP_2$ of the second comb tooth of the comb-shaped frequency characteristic of the recording/reproducing channel as shown in FIG. 2(e) from among those shown in FIG. 2(a), it is necessary to substitute the value 4 for n in the above expression (1) in order to set the zero point $NP_2$ of the second comb tooth to the Nyquist frequency f0 (=½T). In this case, waveforms {i(k)}, {a(k)}, b(k) and {o(k)} at various locations in FIG. 1, when the input symbol series {i(k)}={1, 0, 1, 0, 0, 1, 1, 0, 1, 0} are inputted from the input terminal 100 in FIG. 1, are shown in FIG. 4. The waveform {a(k)} corresponds to a recording current waveform to be supplied to the recording head of the recording/reproducing channel. A waveform b(k) obtained through the transmission channel 102 is sampled by the discriminator 103 in FIG. 1, as a ternary signal string comprising −1, 0, and +1 as the result of discriminating three levels (1, 0, −1). It is understood that waveform {o(k)} coincides with waveform {i(k)} by applying the operation of mod2 shown by the expression (5) to the ternary signal string b(k). As a result, a frequency characteristic that is practically flat as a DC component to f0 (=½T) is obtained as shown in FIG. 2(c), even with use of a transmission channel having a comb-shaped recording/reproducing characteristic and a transmission rate equivalent to that of the recording/reproducing channel using f0 as a Nyquist frequency. There is a practical advantage of realizing recording/reproducing in a wide band as shown in FIG. 2(c), even for a recording/reproducing channel having a general comb-shaped characteristic, by selecting n and T of the zero-point frequency f(m)=m/(nT) (m is an integer) of the characteristic of the transmission channel 102 shown by the expression (1) so that the integer m coincides with the second or subsequent zero-point frequency of the comb-shaped characteristic and thereby converting the frequency characteristic H(f) of the transmission channel 102 into a function approximate to the characteristic of an actual recording/reproducing channel and simplifying the design of a transmission channel. In FIG. 2(b), when n is set to a higher number than in FIG. 2(c) the wide band characteristics are obtainable for the present invention. But with n set to 2 is in FIG. 2(d) it is seen that the advantageous wide band results of the present invention are not obtained.

Figure 5:
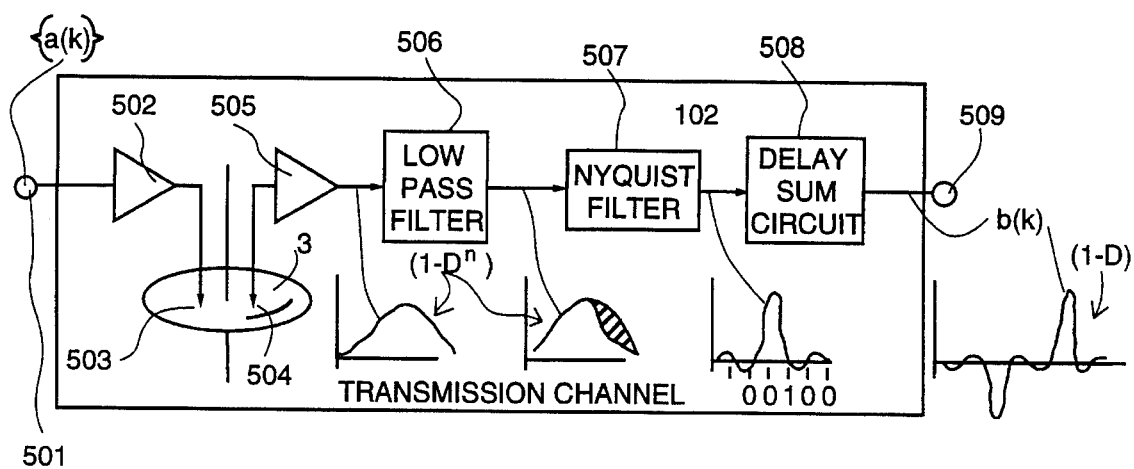
FIG. 5 is a block diagram of the transmission channel of FIG. 1.

FIG. 5 shows the transmission channel 102 of FIG. 1. The transmission channel 102, as a whole has the impulse response $1-D^n$, n>2. The input symbol string a(k) is supplied to the transmission channel 102 from a transmission-channel input terminal 501 and converted into recording current through a write amplifier 502 and thereafter recorded in a recording medium 3 by a recording head 503 and reproduced by a reproducing head 504. A reproduced signal is amplified by a read amplifier 505 and thereafter supplied to the low-pass filter 506 and Nyquist filter 507. Elements 502, 503, 504, 505 as a whole have an impulse response of 1−D. In this case, the recording head 503 may be the same as the reproducing head 504. The characteristics of the low-pass filter 506 and Nyquist filter 507 are designed so that the impulse response characteristic from the transmission channel input terminal 501 through the Nyquist filter 507 comes to 1−D to design the Nyquist frequency f0 of a transmission channel and the 1−D characteristic. The delay sum circuit 508 constitutes a filter for realizing the $(1-D^n)/(1-D)$ characteristic by combining the delay of a one-bit time interval T of a signal with a summing operation.

Elements 506, 507 and 508 are a part of the transmission channel, so that the whole transmission channel will have the frequency response of $1-D^n$ n being>2. The channel without the delay circuit 508 would be a channel having the characteristic 1−D (not the present invention). The pulse coming out of amplifier 505 is of a wide band and has a lot of superimposed high frequency noise, which noise is removed by the low pass filter 506. The Nyquist filter 507 will reduce the pulse width and reshape the pulse to compensate for lost high frequencies with respect to the cross hatched waveform area. The outputs are as shown with respect to the waveforms associated with FIG. 5.

Figure 6A:
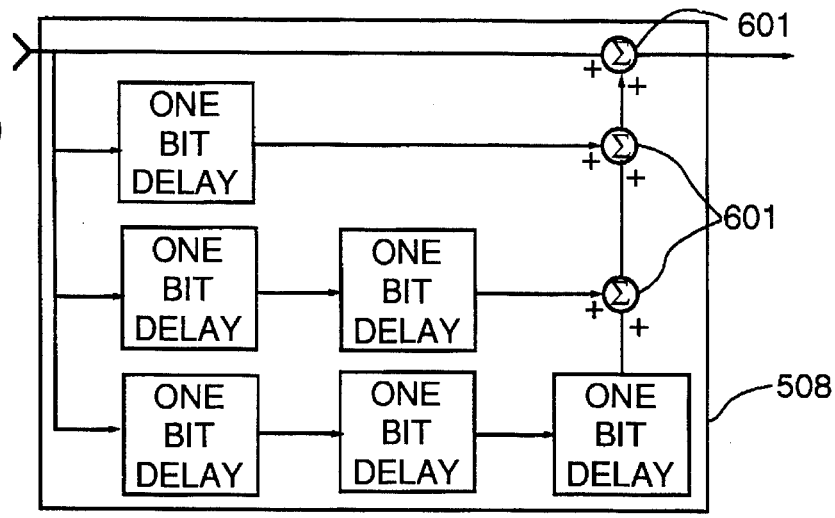
FIGS. 6(a) to 6(d) are block diagrams of different examples of the delay sum circuit of FIG. 5.
Figure 6C:
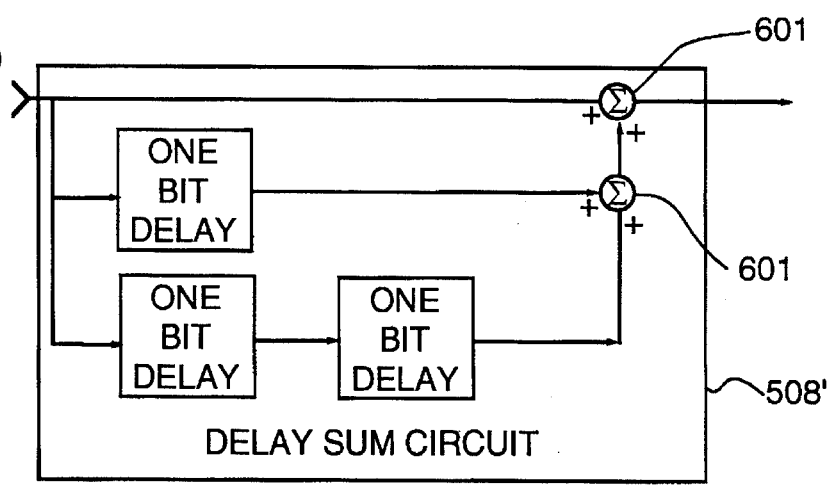
Figure 6B:
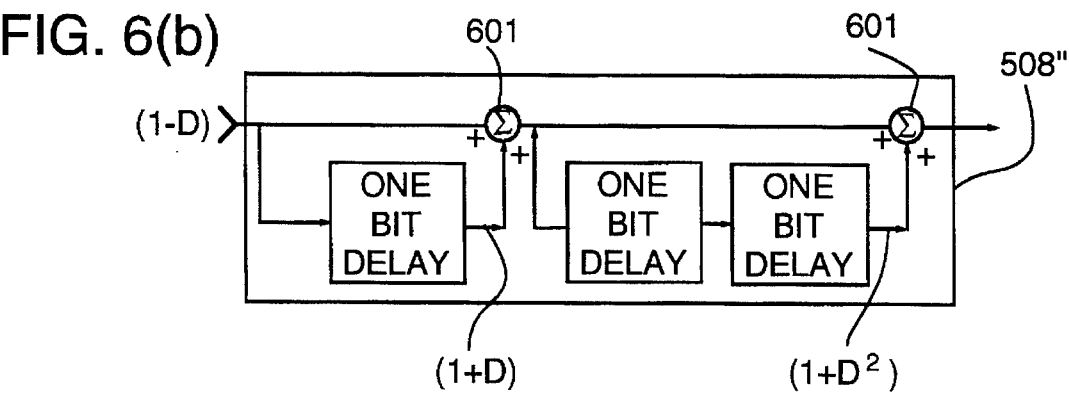
Figure 6D:
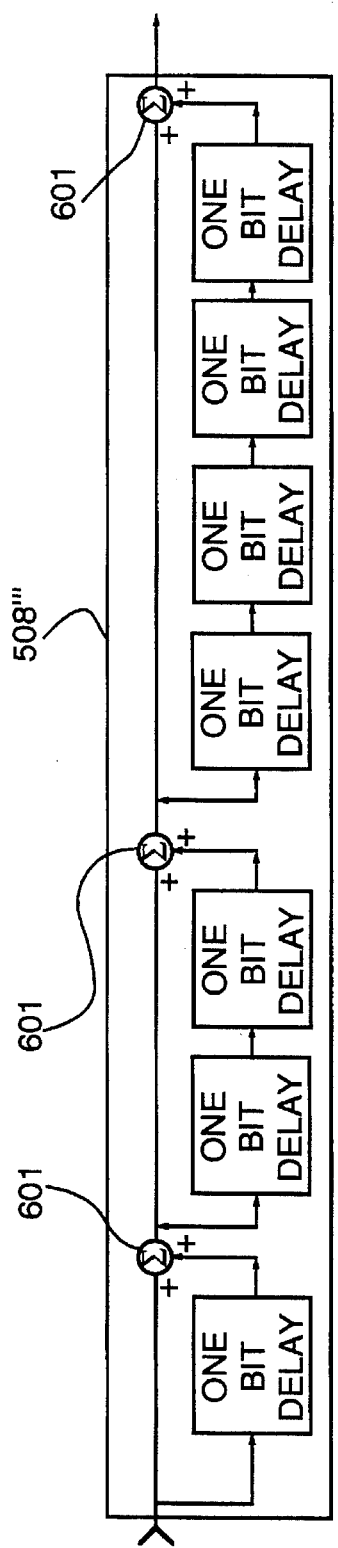

FIG. 6(a) shows one example of the delay sum circuit 508 of FIG. 5 for n=4, in which a term $(1+D+D^2+D^3)$ is obtained by parallel delay lines so that the overall circuit provides $(1-D)(1+D+D^2+D^3)$ or $1-D^4$ by one-bit delay circuits 600 and sum circuit 601. Moreover, another example of the delay circuit 508'' is shown in FIG. 6(b) for n=4 from arranging the term $(1+D+D^2+D^3)=(1+D)(1+D^2)$. FIG. 6(c) shows the delay circuit 508' for realizing $(1-D^3)/(1-D)=(1+D+D^2)$ for n=3. FIG. 6(d) shows the delay circuit 508''' for realizing $1-D^8$, for n=8, which is particularly useful for the transmission channel being in a telephone line. It is noted that the delay sum circuits of FIG. 6(a) and 6(b) are equivalent in result.

The delay sum circuits of FIGS. 6(a)– 6(d) can be realized with an analog circuit or a digital circuit. To form the delay sum circuit 508 as a digital circuit, an A-D converter (analog to digital converter) is provided as a front stage of the delay sum circuit 508. Similarly, the Nyquist filter 507 can be an analog circuit or digital circuit as can be the low pass filter 506 with an appropriate positioning of the A-D converter at the front of the filter 507 or 506.

The low-pass filter 506 in FIG. 5 has a characteristic for cutting off a frequency region equal to or higher than the Nyquist frequency f0 (=½T). The Nyquist filter 507 is an equalizing circuit for converting an isolated magnetizing inversion impulse waveform sent from a recording/reproducing channel into a Nyquist waveform. It is possible to constitute components 506 to 508 or 507 and 508 with one or a plurality of analog or digital circuits. In the present invention, it is important that the impulse response through the recording/reproducing channel (from 501 to 509) is equal to the $1-D^n$ characteristic as accurate as possible. The function of 506 to 508 is to change raw recording/reproducing channel to the $1-D^n$ channel.

Figure 7:
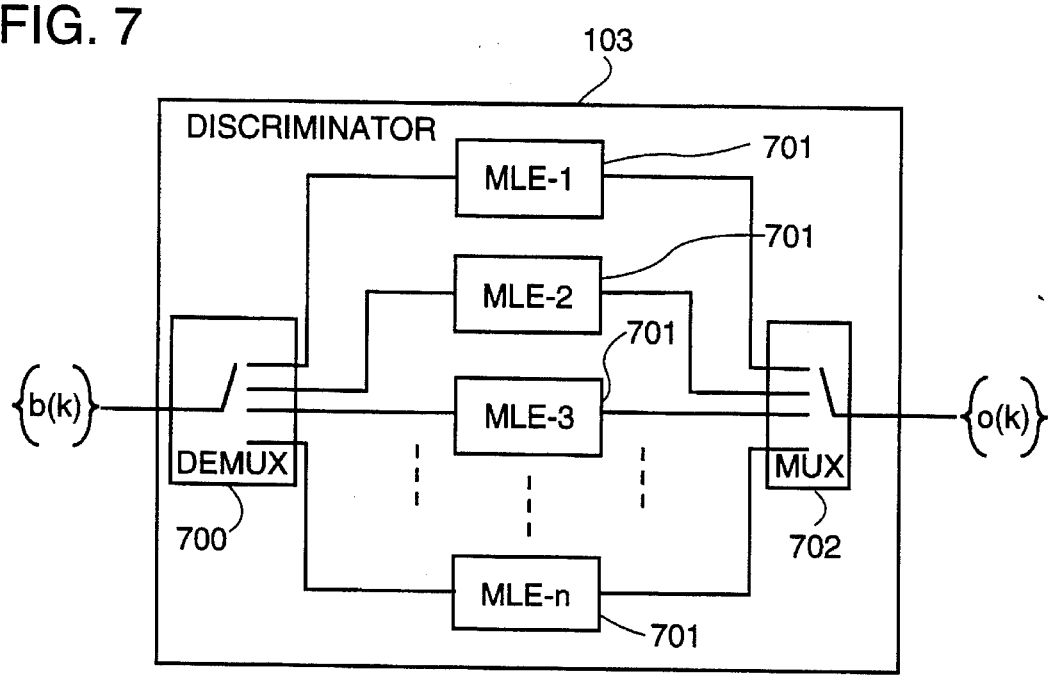
FIG. 7 is a block diagram of the discriminator of FIG. 1.

FIG. 7 shows the discriminator 103 of FIG. 1 with a plurality n of maximum likelihood estimators MLE-1 to MLE-n 701. The output series b(k) of the transmission channel 102 having the $1-D^n$ characteristic has an interference at every n bits because of the above-mentioned characteristic. Therefore, an n series obtained by sampling the output series b(k) at every n bits are equivalent to the output series of decode channels 1−D independent of each other. Therefore, the input series b(k) for the discriminator 103 are sequentially and cyclically distributed to each maximum likelihood discriminator 701 by a multiplexer 700 by arranging n discriminators (maximum likelihood estimators 701) for bringing the output series of the decode channel 1−D into the maximum likelihood state in parallel. The series obtained by sampling the original input series b(k) every n bits is supplied to each maximum likelihood estimator 701 at every time interval of nT. A maximum likelihood estimator is shown in U.S. Pat. No. 4,571,734. In the present invention, the maximum likelihood estimator is particularly useful when n=3, or 4, or more because of the high speed involved, because the circuit speed is the bit rate, which equals 1/nT.

In this case, the maximum likelihood estimator 701 evaluates signal patterns (including those before and after a discrimination symbol) through matching instead of converting an input signal into a symbol at every bit, judges and outputs a symbol string pattern with the highest probability. Thereby, it is possible to obtain a high discrimination reliability even with random noises superimposed on input signals. It is generally known that a maximum likelihood estimator 701 can be realized by applying the Viterbi algorithm, and may be in accordance with U.S. Pat. No. 4,571,734.

That is, each maximum likelihood estimator 701 performs maximum likelihood series estimation by regarding an inputted series as a series having mutual interference following the channel characteristic 1−D and using the Viterbi algorithm. Thereby, individual symbol series discriminated by each maximum likelihood estimator 701 respectively are reconstituted by the multiplexer 702 into a single series {o(k)} according to the same sequence as the sequence provided when the multiplexer 700 distributes input series {b(k)}. This discriminator 103 realizes high-speed discrimination by using a plurality n of parallel maximum likelihood estimators 701 each with propagation time n times T. Because a maximum likelihood estimator (MLE) 701 is normally realized with a digital circuit, an A-D converter is placed before the multiplexer 700 when the input series {b(k)} is supplied as an analog signal.

Figure 8:
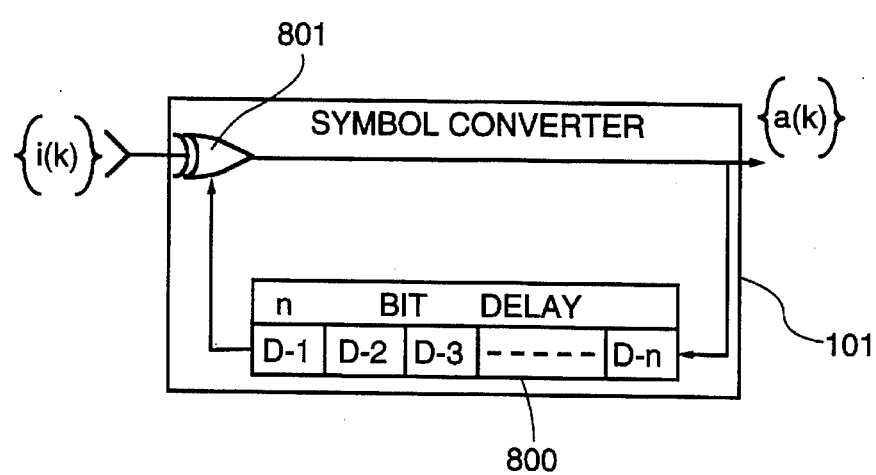
FIG. 8 is a block diagram of the symbol converter or precoder of FIG. 1.

FIG. 8 shows the symbol converter 101 of FIG. 1, for symbol conversion in the expression (4), with an n-bit delay line 800 or n-stage/bit shift register (e.g. n=4) and an exclusive OR circuit (XOR) 801.

Figure 9:
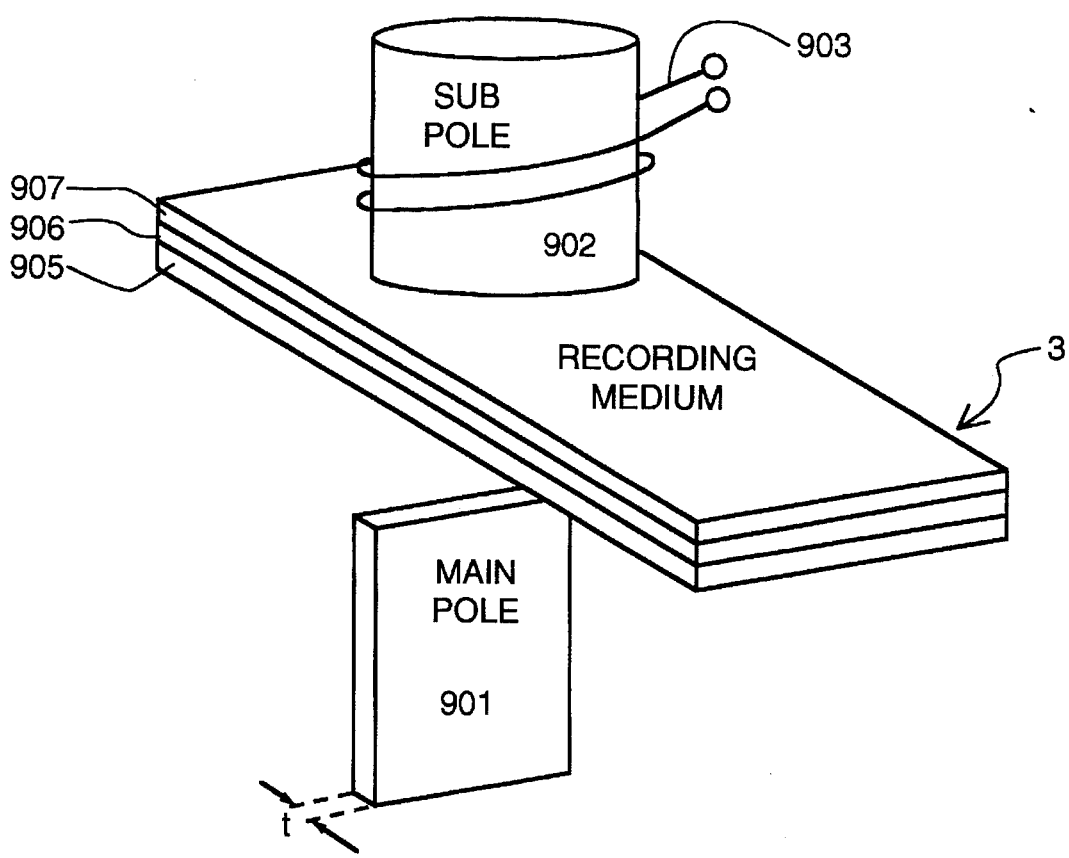
FIG. 9 is an illustration of a perpendicular magnetic recording head medium system of FIG. 1.

The perpendicular magnetic recording that may be employed as a part of the magnetic recording channel of FIG. 1(a) is described in detail in the paper Iwasaki, Shunichi et al, "Studies of the Perpendicular Magnetization in Co-Cr Sputtered Films" of IEEE TRANSACTION ON MAGNETICS, VOL. MAG-16, No. 5, September 1980, pp. 1111–1113, and is shown in FIG. 9, which has a main pole 901 made of a permalloy thin film with a high permeability and a sub pole 902, spaced from the main pole 901 by a predetermined distance and with a coil 903 wound on it. The magnetic recording medium 3 forms a perpendicular recording layer 905, a layer 906 with high permeability and a protective layer 907 arranged between the main poles 901 and sub pole 902. When the coil 903 on the sub pole 902 is electrified, a magnetic flux is generated. The magnetic flux passes through the layer 906 with a high permeability and is absorbed by the main pole 901, and thus perpendicular magnetic recording is performed on the perpendicular recording layer 905 in the vicinity of the main pole 901.

For reproducing, a magnetic flux emitted from the magnetic recording medium 3 induces a flux change in the coil 903 due to interaction with the main pole 901 and a reproduced output is obtained. The recording/reproducing characteristic of the perpendicular magnetic recording system is described by referring to FIG. 2, consisting of FIGS. 2(a)–2(e). The frequency characterized in the reproducing output exhibits a comb shape determined by the thickness "t" of the main pole 901 and it is known that the frequency characteristic includes several spectral null frequency points NP, etc. Moreover, low frequencies are generally cut off in a magnetic recording/reproducing channel.

The present invention realizes accurate recording/reproducing with a Nyquist frequency exceeding the usual output frequency of a recording/reproducing channel, for a recording/reproducing channel having a spectral null frequency point in addition to a DC component. Therefore, high-density high-speed magnetic recording/reproducing is realized by effectively using the wide bandwidth region of the recording/reproducing channel and also the recording/reproducing channel is more easily designed. Dividing a reproduced signal series into a plurality of independent series greatly decreases the operating speed of a series discriminator as compared with the reproducing speed.

While a preferred embodiment has been set forth with specific details, further embodiments, modifications and variations are contemplated according to the broader aspects of the present invention, all as determined by the spirit and scope of the following claims.

We claim:

1. A magnetic recording/reproducing method, comprising:

magnetically recording and reproducing a pulse string with a transmission channel including a magnetic recording/reproducing head, a magnetic recording medium and a transducing characteristic, the transducing characteristic having a plurality of spectral null frequency points that are in addition to a DC current null point and having a comb-shaped output;

adding an intersymbol interference to the pulse string during said recording and reproducing to obtain a partial-response code of a polynomial $1-D^n$, where $D^n$ is an n-bit signal delay and n is an integer greater than 2;

providing the pulse string with a Nyquist frequency equal to a second or higher one of the spectral null frequency points forward from a lowest frequency and excluding a vicinity of the DC current null point, of the transducing characteristic, under conditions that equal frequency intervals between the spectral null frequency points are each set to 1/nT, (n>2) wherein T is a Nyquist reproduction-bit time interval; and said recording and reproducing using a wide frequency band of signals for the pulse string that exceeds a range from the DC component to the next-lowest spectral null frequency point for high density recording/reproducing.

2. A method according to claim 1, wherein said adding adds intersymbol interference before and after passing the pulse string through the recording/reproducing head for write and read transducing.

3. A method according to claim 2, further including multiplexing the pulse string through a plurality of parallel discriminators downstream of the head and said adding.

4. A method according to claim 3, further including performing maximum likelihood estimation in each of the discriminators.

5. A magnetic recording/reproducing apparatus, comprising:

means for magnetically recording and reproducing a pulse string with a transmission channel including a magnetic recording/reproducing head, a magnetic recording medium and a transducing characteristic, the transducing characteristic having a plurality of spectral null frequency points that are in addition to a DC current point and a comb-shaped output;

means for adding an intersymbol interference to the pulse string to obtain a partial-response code of a polynomial $1-D^n$, where $D^n$ is an n-bit signal delay and n is an integer greater than 2;

means for providing the pulse string with a Nyquist frequency equal to a second or higher one of the spectral null frequency points forward from a lowest frequency and excluding a vicinity of the DC current null point, of the transducing characteristic, under conditions that equal frequency intervals between the spectral null frequency points are each set to 1/nT, (n>2) wherein T is a Nyquist reproduction-bit time interval; and said means for recording on and reproducing from the magnetic recording medium the pulse string as signals using a wide frequency band exceeding a range from the DC current null point to a next-lowest spectral null frequency point for high density.

6. An apparatus according to claim 5, wherein said means for adding adds intersymbol interference before and after passing the pulse string through the recording/reproducing head for write and read transducing.

7. An apparatus according to claim 6, further including means for multiplexing the pulse string through a plurality of parallel discriminators downstream of the recording/reproducing head and said adding.

8. An apparatus according to claim 7, wherein each of the discriminators performs maximum likelihood estimation.

9. An apparatus for magnetically recording/reproducing a pulse string, comprising:

a transmission channel including a magnetic recording/reproducing head, a magnetic recording medium and a plurality of spectral null frequency points in addition to a DC current null point in a transducing characteristic of a comb-shaped output;

means for setting a spectral null frequency point interval of the pulse string to 1/nT (wherein T is a Nyquist interval and n is a positive integral greater than 2) and adding an intersymbol interference to the pulse string having a Nyquist frequency equal to or higher than a second one of the spectral null frequency points so that an impulse response becomes a partial-response channel shown by a polynomial $1-D^n$, (n>2); and said transmission channel for recording on and reproducing from the magnetic recording medium the pulse string as signals using a wide frequency band exceeding a range from the DC current null point to a next-lowest spectral null frequency point for high density.

10. An apparatus according to claim 9, wherein the transmission channel is for Nyquist-waveform-equalizing the pulse string from the recording/reproducing head and for thereafter delay-summing the pulse string to have a characteristic $(1-D^n)$ for reading.

11. An apparatus according to claim 10, wherein the means for setting and adding includes a symbol converter for addition of the intersymbol interference to the pulse string prior to transducing by exclusive-OR ing each bit of the string and a preceding string bit delayed by bit intervals for writing.

12. An apparatus according to claim 11, further comprising a plurality of discriminators and a demultiplexer for sequentially supplying the pulse strings with the intersymbol interference from the magnetic recording/reproducing head to the discriminators, said discriminators being arranged in parallel, and a multiplexer for connecting output of each discriminator in order to provide a reproduced string during reading.

13. An apparatus according to claim 12, wherein each of said discriminators is a maximum likelihood estimator.

14. An apparatus according to claim 13, wherein said magnetic recording/reproducing head is for perpendicular magnetic recording on the recording medium.

15. An apparatus according to claim 10, further comprising a plurality of discriminators and a demultiplexer for sequentially supplying the pulse strings with the intersymbol interference from the magnetic head to the discriminators, said discriminators being arranged in parallel, and a multiplexer for connecting output of each discriminator in order to provide a reproduced string during reading.

16. An apparatus according to claim 15, wherein said magnetic recording/reproducing head is for perpendicular magnetic recording on the recording medium.

17. An apparatus according to claim 15, wherein each of said discriminators is a maximum likelihood estimator.

18. An apparatus according to claim 17, wherein said magnetic recording/reproducing head is for perpendicular magnetic recording on the recording medium.

19. An apparatus according to claim 9, wherein the means for setting and adding includes a symbol converter for addition of the intersymbol interference to the pulse string prior to transducing by exclusive-OR ing each bit of the string and a preceding string bit delayed by bit intervals for writing.

20. An apparatus according to claim 19, wherein said magnetic recording/reproducing head is for perpendicular magnetic recording on the recording medium.

21. An apparatus according to claim 9, further comprising a plurality of discriminators and a demultiplexer for sequentially supplying the pulse strings with the intersymbol interference from the magnetic head to the discriminators, said discriminators being arranged in parallel, and a multiplexer for connecting output of each discriminator in order to provide a reproduced string during reading.

22. An apparatus according to claim 21, wherein each of said discriminators is a maximum likelihood estimator.

23. An apparatus according to claim 22, wherein said magnetic recording/reproducing head is for perpendicular magnetic recording on the recording medium.

24. An apparatus according to claim 21, wherein said magnetic recording/reproducing head is for perpendicular magnetic recording on the recording medium.

25. An apparatus according to claim 21, wherein the means for setting and adding includes a symbol converter for addition of the intersymbol interference to the pulse string prior to transducing by exclusive-OR ing each bit of the string and a preceding string bit delayed by bit intervals for writing.

26. An apparatus according to claim 25, wherein each of said discriminators is a maximum likelihood estimator.

27. An apparatus according to claim 26, wherein said magnetic recording/reproducing head is for perpendicular magnetic recording on the recording medium.

28. An apparatus according to claim 9, wherein said magnetic recording/reproducing head is for perpendicular magnetic recording on the recording medium.

* * * * *